(12) United States Patent
von Gutfeld et al.

(10) Patent No.: US 6,179,679 B1
(45) Date of Patent: Jan. 30, 2001

(54) METHOD AND SYSTEM FOR CURING ULTRA VIOLET CURABLE SEALANT THAT IS SHADOWED BY METALLIZATION

(75) Inventors: Robert J. von Gutfeld, New York; James H. Glownia, Somers; Gareth G. Hougham, Ossining, all of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/425,701

(22) Filed: Oct. 22, 1999

(51) Int. Cl.[7] .................................................. G02F 1/1339
(52) U.S. Cl. ............................................... 445/25; 349/190
(58) Field of Search ................................ 445/25; 349/190

(56) References Cited

U.S. PATENT DOCUMENTS 5,263,888  11/1993  Ishihara et al. .
5,959,712 * 9/1999  Morii et al. ............................ 349/190

* cited by examiner

*Primary Examiner*—Kenneth J. Ramsey
(74) *Attorney, Agent, or Firm*—Ohlandt, Greeley, Ruggiero & Perle

(57) ABSTRACT

The invention is a method for curing a sealant used to affix two substrates to one another. The sealant requires curing by heat or uv photons. To overcome the shadowing caused by metal patterns, the uv light in the form of laser light is delivered at slant angles without losing light due to strong reflections caused by shallow angles of incidence. Several embodiments are described including a modulation technique for a providing scanned uv beam. Another method utilizes a sufficiently strong pulsed stationary or moving laser beam that can heat the regions of a metallized pattern to provide thermal energy for curing the sealant while providing uv photons through open regions of the metal pattern to access the sealant so as to afford a photolytic cure of a hybrid sealant.

13 Claims, 3 Drawing Sheets

METHOD AND SYSTEM FOR CURING ULTRA VIOLET CURABLE SEALANT THAT IS SHADOWED BY METALLIZATION

FIELD OF THE INVENTION

The invention relates to an improved method for affixing two objects together with an ultra violet (uv) curable sealant and, more particularly, to a method and system for curing such a sealant that is shadowed by metallization components

BACKGROUND OF THE INVENTION

In a uv curable sealant, the uv radiation causes release of initiators in the sealant, leading to cross-linking or curing of the sealant (e.g., an epoxy). Often there is a problem of accessing regions of sealant with the uv radiation when there are metallized sections through which the uv cannot penetrate. For example, when the uv light is incident normal to the plane of the sealant, only that part of the sealant not shadowed by metallization can be expected to be affected by the uv radiation. As a result, sealant residing beneath metallization generally remains uncured. If there are alternating lines of metallization, only the sealant not covered by the metallization becomes cured, resulting in alternating sections of cured and uncured polymer. Such configurations (and hence problems) exist along boundaries of a flat panel display, where input/output lines of the panel block the uv irradiation used to cure the sealant between the two glass panels forming the display.

Currently, glass substrates used in a flat panel display are affixed to each other with a thermal setting epoxy, prior to filling of the panel with the liquid crystal material. This method of construction makes it possible to use relatively high curing temperatures, since the liquid crystal is not exposed to these temperatures (which the liquid crystal cannot tolerate). This thermal sealing method provides a very robust seal.

In general, a narrow filament of sealant material is dispensed over the entire outer periphery of one of the two substrates forming the panel except for a small region left vacant for liquid crystal filling. The two substrates are then joined and the composite baked to cure the sealant. After filling with liquid crystal, the small fill-opening is sealed with a uv epoxy, and cured or cross-linked by radiation from one or more uv lamps directed in a direction parallel to the panel.

A newly proposed scheme, based on the disclosure of U.S. Pat. No. 5,263,888 to Ishihara et al., uses a one drop fill method, or ODF. The liquid crystal is deposited onto one of the substrates prior to affixing the second substrate. A uv sealant is then used over the entire periphery to hold the first substrate to the second substrate, and the sealant cured with uv radiation from one or more mercury lamps. The problem with this procedure is that there are then regions of metallization on both substrates that prevent uv light from reaching sealant using normal incidence uv illumination.

One previously proposed exposure method for overcoming this problem involves use of edge-on illumination in conjunction with a high intensity uv light source such as a laser. However this method can cause damage to the liquid crystal should the uv penetrate the lateral dimension of the glue seal, and enter into the region of the liquid crystal. It has also been suggested that a barrier wall could alleviate this potential problem, but it is not clear that panel manufacturers are willing to adopt this proposed scheme as it adds cost to the manufacturing cycle.

Accordingly, it is an object of the invention to provide an improved method for affixing two objects together with a curable sealant, preferably uv, but other wavelength sealants are acceptable.

It is a further object of the invention to provide a method and system for curing such a uv-curable sealant that is shadowed by metallization components.

SUMMARY OF THE INVENTION

The present invention makes use of high intensity laser or lamp radiation that can be directed in a manner that can reach the sealant even when the sealant is shadowed by metallized sections of a panel substrate. In a first embodiment where a panel includes metallized lines that extend out to its periphery, a focused, scanned uv laser, preferably pulsed, is intensity modulated. When the radiation is at or near normal incidence to the plane of the panel and the light is directed onto the metal or the shadowed region, the metal becomes heated by absorption of the intense uv laser flux. The thermal energy is transferred from the metal to the sealant to cure the sealant locally by thermal means. In this embodiment, the sealant can be cured either thermally or by photon irradiation.

When the laser is scanned to an adjacent section which contains no shadowing metallization, the laser intensity is decreased and the sealant is cured directly by the uv photons.

In a second embodiment, the required uv laser light is brought into the shadowed region by refracting the uv light through an additional glass member that resides on the surface of the panel, either directly through the glass member or by way of a set of light pipes. In this configuration the laser light enters the sealant at a very shallow angle, thereby penetrating beneath the shadowing metallization and providing the needed photons for curing of the sealant.

In a third embodiment, the uv light is reflected back into the region to be cured by way of a diffuse reflector.

DETAILED DESCRIPTION OF THE INVENTION

Hereafter, different methods will be described for using a pulsed or cw light source, preferably a uv laser, to access hard to reach regions to cure an epoxy or polymeric sealant. The laser may be stationary, with its beam scanned by appropriate mirrors. In addition, methods for modulating the intensity of the laser will be described that provide both (i)

uv photons for curing those portions of a sealant directly accessible by uv light and (ii) means for absorbing the uv photons in opaque regions of the metallization.

This method provides thermal energy that is transferred to the sealant by thermal conduction and cures the otherwise shadowed regions. In this case, the sealant may be a 'hybrid' sealant, i.e., one in which the initiators in the polymer sealant react to uv as well as to thermal energy for cross-linking of the sealant. In such case, uv light that does not reach the uv curable sealant receives thermal energy by way of thermal conduction from the metallization that becomes heated by direct absorption of the uv light energy.

Figure 1:
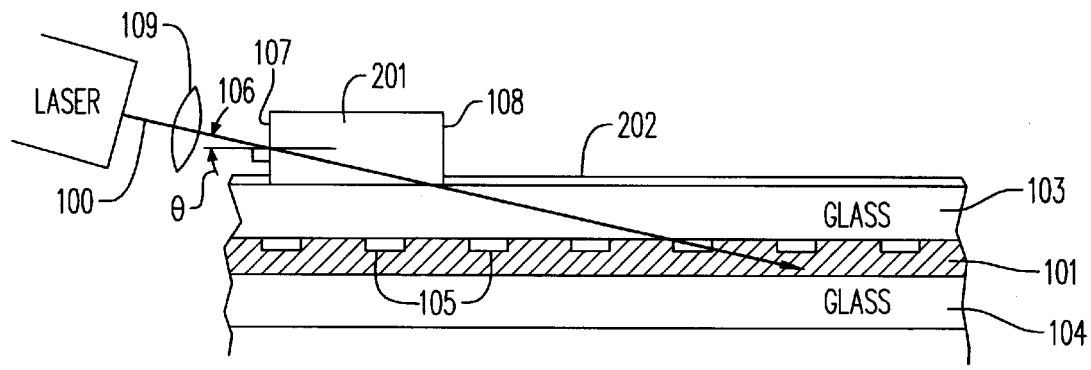
FIG. 1 is a schematic showing two substrates with uv sealant placed between the substrates at the periphery and uv laser light aimed nearly parallel to the plane of the panel by way of an index matched block that is optically coupled to the upper substrate.

FIG. 1 shows how uv light 100 can be used to cure sealant 101 positioned near a peripheral edge of two substrates 103 and 104, with substrate 103 transparent to uv light except where substrate 103 has regions of patterned metallization 105 that prevent normal incident light from penetrating to reach sealant 101. However, because uv beam 100 is brought in at a shallow angle 106 (on the order of 15°), uv beam 100 is able to access vertically shadowed regions of sealant.

A uv transmitting block 201 rests on top of substrate 103 and is optically coupled to substrate 103 by a Fluid couplant 202. Couplant 202 permits light to pass from block 201 to substrate 103 with minimal loss and while the light entering block 201 uses refraction or bending of the beam to couple the light into the substrate, and under metallization 105. The uv light 100 is incident at small angle theta with respect to face 107 of block 201 and therefore experiences little reflection or refraction. The angle theta that Is chosen depends on the dimensions and spaces between metal conductors 105. A typical angle of incidence convenient for several applications such as flat panels might be 7–15 degrees with respect to the horizontal. Because of the index matching couplant 202, there is no refraction of the light beam at the couplant surface.

Block 201 is moved along substrate 103 in synchronism with the uv light 100 by way of a mechanical arm (not shown) controlled by a computer. To cure the entire periphery of substrates 103 and 104 requires scanning the uv light 100 and block 201 along the entire periphery of the two substrates. To enhance the amount of uv light reaching the shadowed area and absorbed in sealant 101, light can be brought into the block 201 from opposite ends of the block (e,g, through both faces 107 and 108), again at an angle 7–15 degrees with respect to the horizontal, though not limited to these angles. As block 201 moves, the angle theta can be maintained by adjustment of lens 109 by any known means. The angle theta can be maintained constant as block 201 moves along the surface by means of moving the lens and the source of the optical beam in synchronism with the movement of the block. This is especially convenient when the light is delivered by fiber.

Figure 2:
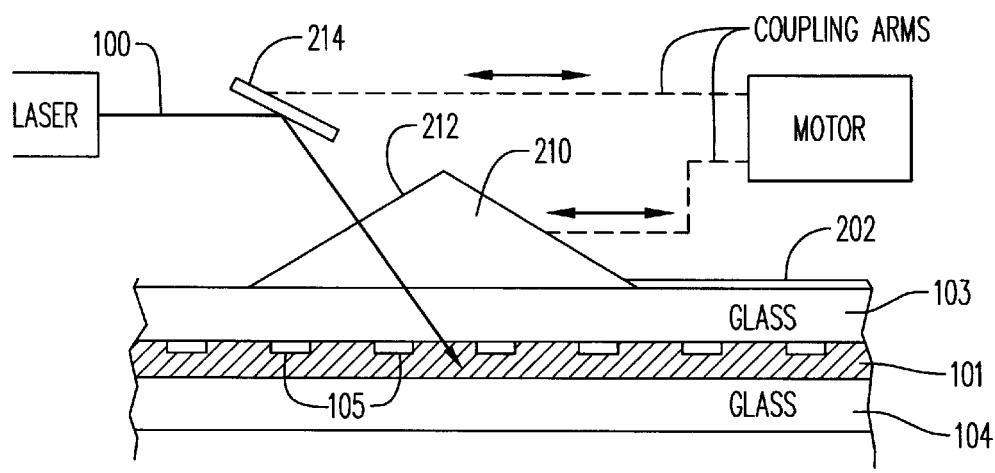
FIG. 2 shows a second refractive index matching triangular block that allows light entering at a shallow angle to pass under the metallization for curing the sealant.

FIG. 2 shows an alternative refractive index matching block configuration comprising a triangular block 210 with a plane 212. The positioning of plane 212 enables light beam 100 to be directed by a mirror 214 at an angle that is substantially orthogonal to plane 212, minimizing reflections and refraction. This arrangement also requires an index matching fluid 202 and is moved in essentially the same manner as block 201 in FIG. 1 to couple light under the regions of otherwise shadowing caused by metallization 105.

Alternatively, the optical coupling block and laser may be stationary while the panel is made to move relative to the fixed optical coupler.

Figure 3:
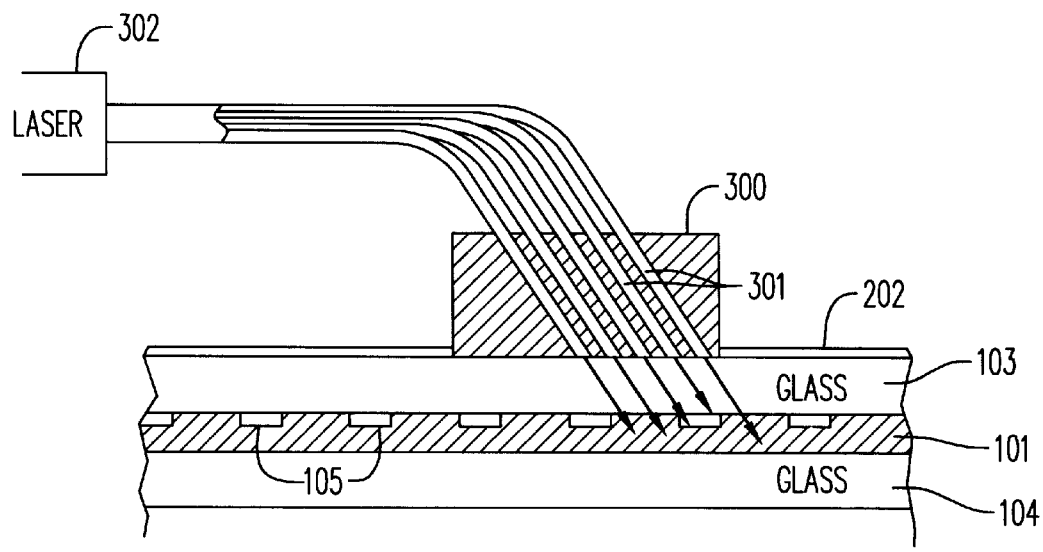
FIG. 3 is a schematic of a uv transparent block into which an array of light pipes or fibers is fitted at an angle to irradiate the sealant.

A further embodiment for coupling uv radiation to the sealant is shown in FIG. 3. Here, a block 300 is placed along one edge of the substrate 103 and 104. Block 300 is preferably transparent to uv light, though this is not a necessity. Light pipes or fibers 301, capable of transmitting uv are placed at a shallow angle with respect to the horizontal, so that the ends of light pipes or fibers 301 make contact either with substrate 103 or with a uv transparent portion of the block 300.

A uv light beam, preferably from laser 302, is directed into light pipes 301 and coupling fluid 202 is again used to optically couple light pipes 301 or block 300 to substrate 103 so that the light again enters substrate 103 at a relatively shallow angle with respect to the horizontal without refraction at layer 202. In this case, neither the uv light beam nor block 300 require movement during substrate edge irradiation of sealant 101 (i.e., when the block extends over the length of an entire substrate edge). However, to seal multiple edges can require the use of multiple blocks and light pipes or the movement of one block with one set of light pipes to the different edges forming the periphery of substrate 103. The block can also be rotated and placed 180 degrees from the position shown to add uv light from a direction in the opposite sense shown to the regions otherwise shadowed by normal incident light.

Figure 4:
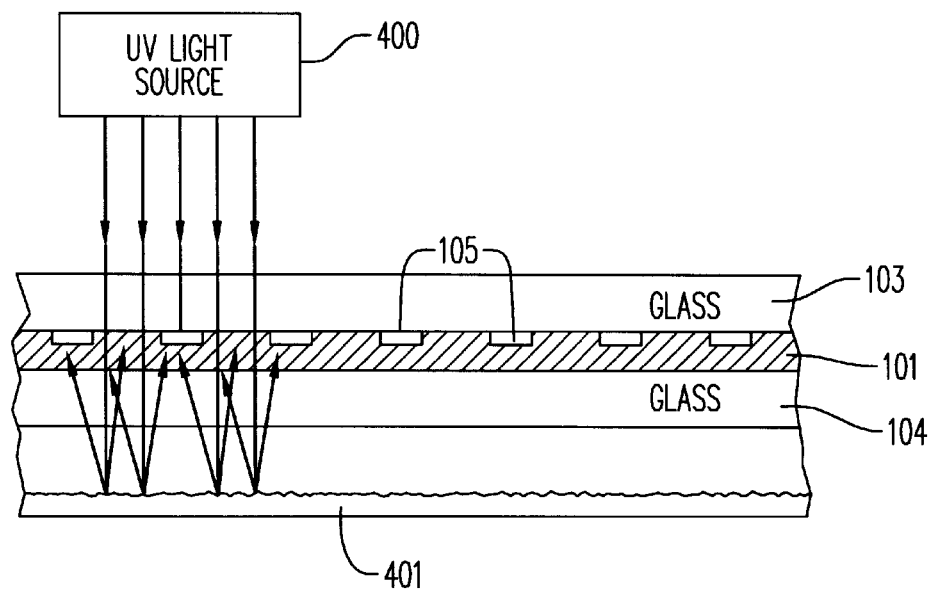
FIG. 4 shows a reflecting surface that scatters uv light transmitted through the sealant, back towards the sealant.

FIG. 4 shows still a further embodiment wherein light from a uv source 400 such as a uv lamp or preferably a defocused laser, is incident on one or more edges of substrate 103 near sealant strip 101. To cure the portions of sealant strip 101 shadowed by metallization 105, a reflector 401 is positioned below substrate 104. Accordingly, the uv light is reflected and preferably scattered back into the substrate 104 and sealant strip 101 to cure parts of the sealant that are shadowed. Reflector 401 can be smooth, preferably unpolished or with micron sized asperities to provide diffuse reflection, the latter offering a better distribution of the scattered light to reach all parts of sealant 101.

Here, the uv source and reflector may be made to remain stationary while the panel moves relative to the uv source and reflector or vice-versa.

Figure 5:
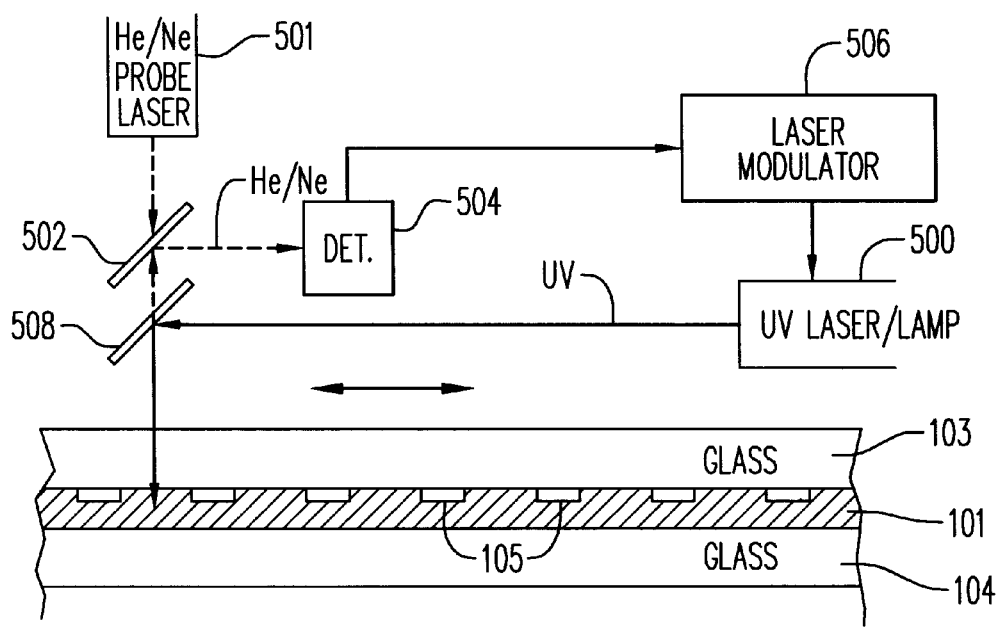
FIG. 5 is a schematic representation of a system which can modulate the uv laser light or a high intensity bulb by way of a secondary laser and light sensor or detector in conjunction with a computer to synchronize the timing of the strength of the uv laser intensity between the shadowed and unshadowed sealant regions.

FIG. 5 shows still another embodiment wherein a focused scanning uv laser 500 is positioned above substrate 103. Here, the intensity of the uv laser light from laser 500 is varied as it traverses the periphery of substrate 103 to cure sealant 101. A secondary laser 501, such as a small He—Ne laser (in the mw power range), is directed onto the sealant region. When the beam from He—Ne laser 501 is strongly reflected by metallization 105, it travels via half silvered mirror 502 to a light detector 504. A strong reflection causes detector 504 to output a signal to indicate that the beam from laser 500 is approaching a metallized region 105. This, in turn, causes modulator 506 to increase the intensity of laser or light source 500, so as to cure the shadowed region by heating. Conversely, a weak reflection indicates that the beam from laser 500 is in or about to approach an area that is not shadowed so that the modulated uv power is appropriately reduced to cure the sealant directly.

Mirrors 502 and 508 move in synchronism together with detector 504 to maintain the modulated uv beam and the He—Ne beam synchronized with the patterned metallization. The motion is controlled by a computer (not shown).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for joining a first substrate to a second substrate, said first substrate being transparent to optical radiation and including metallization features thereon, said method comprising the steps of:

a) placing a curable sealant between said first substrate and said second substrate, portions of said sealant partially blocked from said optical radiation by said metallization features; and b) placing an optically transmissive block on a surface of said first substrate, in the path of said optical radiation, to direct said optical radiation towards said sealant at an angle that avoids said metallization features from blocking said optical radiation so that said sealant is exposed to said optical radiation and is thereby aided in curing.

2. The method as recited in claim 1, wherein said optical radiation is in the ultraviolet range.

3. The method as recited in claim 1 wherein a surface of said block is optically coupled to said surface of said first substrate by an interposed index matching material.

4. The method as recited in claim 1, wherein said optical radiation is directed at said block so as to exit therefrom and into said first substrate at said angle, said angle set to enable said optical radiation to expose sealant that lies beneath said metallization features.

5. The method as recited in claim 4, wherein step b) directs said optical radiation to enter a face said block in a manner that minimizes reflections therefrom and refraction therein, while still assuring exit of said optical radiation at said angle.

6. The method as recited in claim 4, wherein said block comprises a plurality of light fibers.

7. The method as recited in claim 1, wherein said method comprises the further step of:

c) moving said block and optical radiation along the surface of said first substrate so as to expose areas of said sealant lying along a border of said first substrate.

8. A method for joining a first substrate to a second substrate, said first substrate being transparent to optical radiation and including metallization features thereon, said method comprising the steps of:

a) placing a curable sealant between said first substrate and said second substrate, portions of said sealant partially blocked from said optical radiation by said metallization features; and b) directing said optical radiation towards said sealant;

c) increasing energy of said optical radiation in regions where said metallization features block said optical radiation so that said optical energy acts to heat said metallization features, said sealant that is directly exposed to said radiation being cured thereby, said sealant that is blocked by said metallization features being at least partially cured by said heat.

9. The method of claim 8, wherein step c) directs an interrogating beam at said first substrate while said first substrate experiences relative movement with respect thereto, monitors reflections from said first substrate and employs signals derived from said reflections to control emitted energy from a source of said optical energy.

10. The method as recited in claim 8, wherein said optical radiation is in the ultraviolet range.

11. A method for joining a first substrate to a second substrate, both said first substrate and second substrate being transparent to optical radiation, at least said first substrate including metallization features thereon, said method comprising the steps of:

a) placing a curable sealant between said first substrate and said second substrate, portions of said sealant partially blocked from said optical radiation by said metallization features; and b) positioning said first substrate and second substrate over a reflector;

c) directing said optical radiation through said first substrate, said second substrate and said sealant, said radiation, where not blocked by said metallization features, being retroreflected by said reflector so as to impinge on sealant that is blocked by said metallization features.

12. The method of claim 11, wherein said reflector manifests a reflecting surface that provides a diffuse reflection action on incident optical radiation.

13. The method as recited in claim 11, wherein said optical radiation is in the ultraviolet range.

* * * * *